US012776298B2

(12) United States Patent
Bohanan et al.

(10) Patent No.: US 12,776,298 B2
(45) Date of Patent: Oct. 27, 2026

(54) QUIET FLIGHT DECK COMMUNICATION USING ULTRASONIC PHASED ARRAY

(71) Applicant: Gulfstream Aerospace Corporation, Savannah, GA (US)

(72) Inventors: Scott Bohanan, Savannah, GA (US); Tongan Wang, Savannah, GA (US); Jim Jordan, Savannah, GA (US)

(73) Assignee: GULFSTREAM AEROSPACE CORPORATION, Savannah, GA (US)

( * ) Notice: Subject to any disclaimer, the term of this patent is extended or adjusted under 35 U.S.C. 154(b) by 149 days.

(21) Appl. No.: 17/082,858

(22) Filed: Oct. 28, 2020

(65) Prior Publication Data

US 2022/0130369 A1 Apr. 28, 2022

(51) Int. Cl.
*G10K 11/34* (2006.01)
*H04B 11/00* (2006.01)
(Continued)

(52) U.S. Cl.
CPC ............ *G10K 11/346* (2013.01); *H04B 11/00* (2013.01); *H04R 3/005* (2013.01); *H04R 5/02* (2013.01); *H04R 2217/03* (2013.01)

(58) Field of Classification Search
CPC .... G10K 11/341; G10K 11/346; H04B 11/00; H04R 5/02; H04R 2217/03; H04R 3/005
See application file for complete search history.

(56) References Cited

U.S. PATENT DOCUMENTS 11,317,204 B2 * 4/2022 Pan .......................... H04R 3/12
2001/0007591 A1 * 7/2001 Pompei ................ B06B 1/0692 381/160
(Continued)

FOREIGN PATENT DOCUMENTS

DE 102005058826 A1 6/2007
DK 201500091 A1 * 2/2015
(Continued)

OTHER PUBLICATIONS

Gan et al. ("A Review of Parametric Acoustic Array in Air", Applied Acoustics 73 (2012) 1211-1219) (Year: 2012).*
(Continued)

*Primary Examiner* — Yuqing Xiao
*Assistant Examiner* — Christopher Richard Walker
(74) *Attorney, Agent, or Firm* — Ingrassia Fisher & Lorenz, LLP

(57) ABSTRACT

The pilot communication system employs an acoustic transducer disposed on the flight deck and positioned to emit sound waves in the direction of the at least one pilot seating location. A modulator circuit is coupled to receive an audio signal from the avionics communication system and is also coupled to drive the acoustic transducer. The modulator circuit supplies to the acoustic transducer an electrical signal having an ultrasonic carrier frequency modulated by the audio signal, thereby causing the acoustic transducer to deliver a beam of ultrasonic acoustic energy, through the acoustic space, in the direction of the at least one pilot seating location, which beam of ultrasonic acoustic energy is demodulated naturally by traversal through air molecules between the transducer and the pilot seating location, thus rendering the audio signal audible by human hearing at the at least one pilot seating location.

20 Claims, 9 Drawing Sheets

(51) Int. Cl.
*H04R 3/00* (2006.01)
*H04R 5/02* (2006.01)

(56) References Cited

U.S. PATENT DOCUMENTS

| | | | | |
|---|---|---|---|---|
| 2005/0207590 | A1 | 9/2005 | Niehoff et al. | |
| 2005/0248233 | A1 | 11/2005 | Pompei | |
| 2006/0204022 | A1* | 9/2006 | Hooley | H04R 1/403<br>381/117 |
| 2012/0250912 | A1* | 10/2012 | Chung | H04R 27/00<br>381/306 |
| 2015/0382129 | A1* | 12/2015 | Florencio | H04R 5/04<br>381/303 |
| 2017/0195800 | A1* | 7/2017 | Anderson | H04R 25/353 |
| 2018/0129356 | A1* | 5/2018 | Leigh | G01S 7/539 |
| 2018/0343051 | A1* | 11/2018 | Bramoulle | H04B 1/3822 |
| 2019/0293754 | A1* | 9/2019 | Takahashi | G01S 13/931 |

FOREIGN PATENT DOCUMENTS

| | | | | | |
|---|---|---|---|---|---|
| FR | 3066852 | A1 | * | 11/2018 | H04B 1/3822 |
| JP | 2019176350 | A | * | 10/2019 | |
| WO | WO-2005036921 | A2 | * | 4/2005 | G10K 15/02 |
| WO | WO-2012122132 | A1 | * | 9/2012 | H04R 3/12 |

OTHER PUBLICATIONS

FR-3066852-A1 Machine Translation (Year: 2018).*
JP-2019176350-A (Machine Translation) (Year: 2019).*
van der Werff, "Electronically Controlled Loudspeaker Arrays Without Side Lobes", AES 110th Convention, Amsterdam, Netherlands, 2001, May 12-15 (Year: 2001).*

* cited by examiner

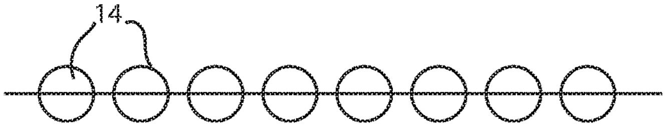
Fig. 8 a
Fig. 8 b
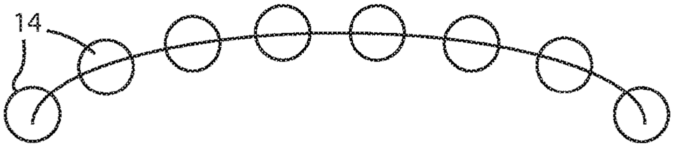
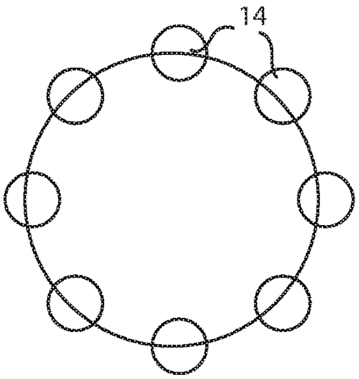
Fig. 8 c
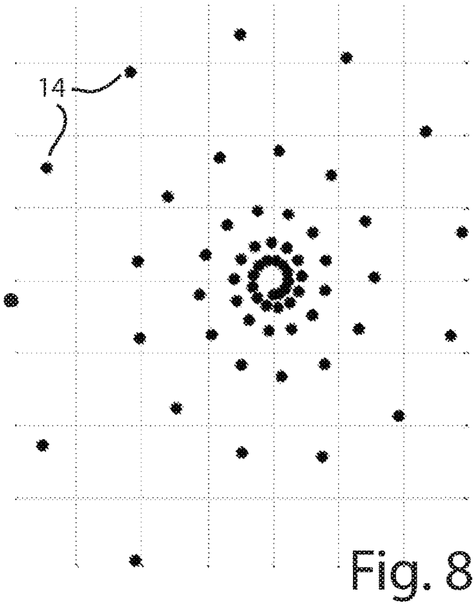
Fig. 8 e
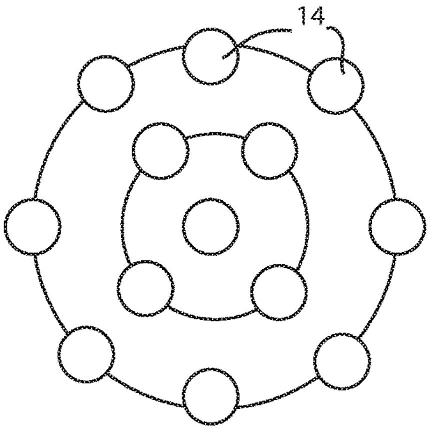
Fig. 8 d
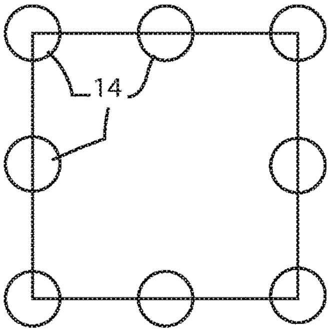
Fig. 8 f

QUIET FLIGHT DECK COMMUNICATION USING ULTRASONIC PHASED ARRAY

TECHNICAL FIELD

The disclosure relates generally to communication systems. More particularly, the disclosure relates to an ultrasonic phased array speaker system to allow pilots to communicate with air traffic control towers and other parties.

BACKGROUND

The cockpit of an aircraft can be quite a noisy environment. At potentially numerous times throughout the flight the pilot or copilot, seated in this noisy environment, will need to communicate with each other, and to receive and communicate important information by radio with air traffic control (ATC), clearly and accurately so that all parties understand. Currently this has been done through the headset. The headset has the advantage of delivering the air traffic control instructions directly to the pilot's (and copilot's) ears and transmitting the pilot's or copilot's communications back to ATC through a close-talk microphone positioned near the pilot's or copilot's mouth.

Thus traditionally, aircraft pilots and copilots have worn headsets during flight, comprising noise isolating or active noise cancelling headsets to which a boom microphone is attached. Such headsets typically employ a close-talk microphone having a pickup pattern designed to pick up the pilot's voice while rejecting sounds originating from other directions. These have worked well, but there are problems.

One problem with conventional headsets is that they can become uncomfortable to wear, particularly for long periods of time. The ear cups on many headsets apply pressure to the sides of the face and sometimes the ears, which can interfere with blood flow if worn too tightly. The air inside the ear cups also become very warm and stale while wearing, thus pilots sometimes need to remove the headsets to give their ears some fresh air.

Also, because they block out much of the ambient cockpit sound, the pilot and copilot may need to take the headsets off in order to hold conversations with others within the cockpit, such as flight attendants or other personnel, who are not also wearing headsets.

In the conventional aircraft, the headset serves a highly important communication function, but it is not the only system within the aircraft that produces audio sound. Aircraft are also equipped with an alert-signal system, which broadcasts alerts through the flight deck speaker system in all directions. The alert system is necessarily designed to be quite loud, so that it can be heard by pilot and copilot over the ambient noise within the cockpit. However, for business jets, during takeoff and landing, all doors between cockpit and cabin are required to remain open. Thus, these alert signals transmit through the cabin easily, causing unnecessary disturbances to the passengers.

In modern day business aircraft, there is increasing interest in providing the aircraft passengers with a quiet, comfortable environment. However, due to the importance of the flight deck communications and alert-signal system messages, it has heretofore been difficult to keep the cockpit sounds from propagating into the passenger cabin. Thus conventionally, pilots have been consigned to wearing headsets, and some propagation of alert system messages into the passenger cabin has been unavoidable.

SUMMARY

The disclosed pilot communication system takes a different approach that reduces pilot and copilot reliance on headsets to communicate with each other and with air traffic control (ATC). Using a phased array ultrasonic transducer speaker system pilots and copilots can easily communicate with each other in the noisy cockpit and can have clear and accurate communications with air traffic control, without the need to wear headsets. The system provides an enhanced signal-to-noise ratio (SNR) toward the pilot and copilot while minimizing the signals to other directions, i.e. the passenger cabin, so the pilot and copilot can readily hear conversations, ATC communications and alert sounds, without disturbing passengers in the cabin, even when the cockpit-cabin doors are open.

Instead of using conventional speakers to fill the cockpit with loud communication system audio sufficient to overcome the ambient noise, the system uses an ultrasonic transducer array that directs the system audio in a narrow ultrasonic beam to the pilot's ears. The ultrasonic beam employs an ultrasonic carrier wave at a frequency that is inaudible to the human ear. The system audio is modulated upon this ultrasonic carrier wave and thus travels with the carrier wave in the direction of the beam. As the beam passes through air molecules in route to the pilot's ears, the modulated wave becomes naturally demodulated through interaction with the air molecules. Because of this natural demodulation, the pilot is able to hear the demodulated audio signal, sounding much as if it had come from a conventional speaker.

According to one aspect, the pilot communication system employs an acoustic transducer disposed on the flight deck and positioned to emit sound waves in the direction of the at least one pilot seating location. A modulator circuit is coupled to receive an audio signal from the avionics communication system and is also coupled to drive the acoustic transducer. The modulator circuit supplies to the acoustic transducer an electrical signal having an ultrasonic carrier frequency modulated by the audio signal, thereby causing the acoustic transducer to deliver a beam of ultrasonic acoustic energy, through the acoustic space, in the direction of the at least one pilot seating location, which beam of ultrasonic acoustic energy is demodulated naturally by traversal through air molecules between the transducer and the pilot seating location, thus rendering the audio signal audible by human hearing at the at least one pilot seating location.

In another aspect, a method of communicating audio information to the pilot of an aircraft is provided by obtaining an audio signal from an avionics communication system and modulating the audio signal upon an ultrasonic carrier wave to produce a modulated ultrasonic signal. The avionics communication system may include all radios (including but not limited to air traffic control), intercom (flight deck and cabin), crew alert-signal system, and the like. The modulated ultrasonic signal is delivered through an acoustic transducer to the pilot as an ultrasonic acoustic beam that becomes demodulated naturally by traversal through the air between the transducer and the pilot, thus rendering the audio signal audible to the pilot.

BRIEF DESCRIPTION OF THE DRAWINGS

The drawings described herein are for illustrative purposes only of selected embodiments and not all possible implementations. The particular choice of drawings is not intended to limit the scope of the present disclosure.

FIGS. 8*a*-8*g* are plan views of some different transducer or speaker placement embodiments usable with the pilot communication system.

DETAILED DESCRIPTION

Figure 1:
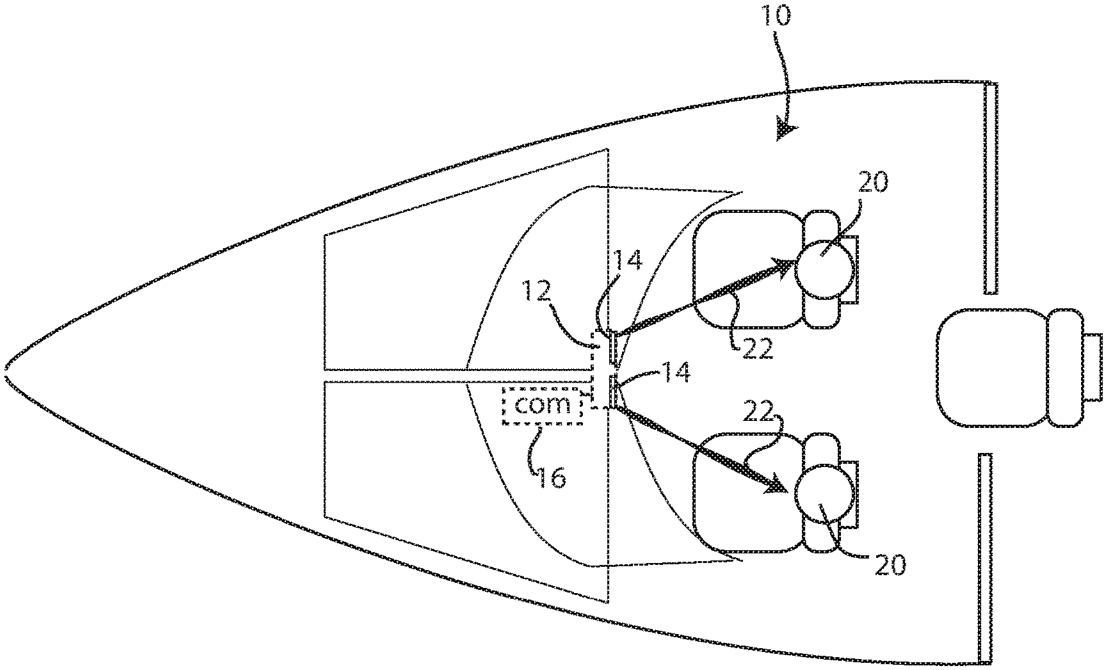
FIG. 1 is a top down view of the flight deck of an exemplary aircraft, showing one possible placement of the ultrasonic phased array speaker system.
Figure 2:
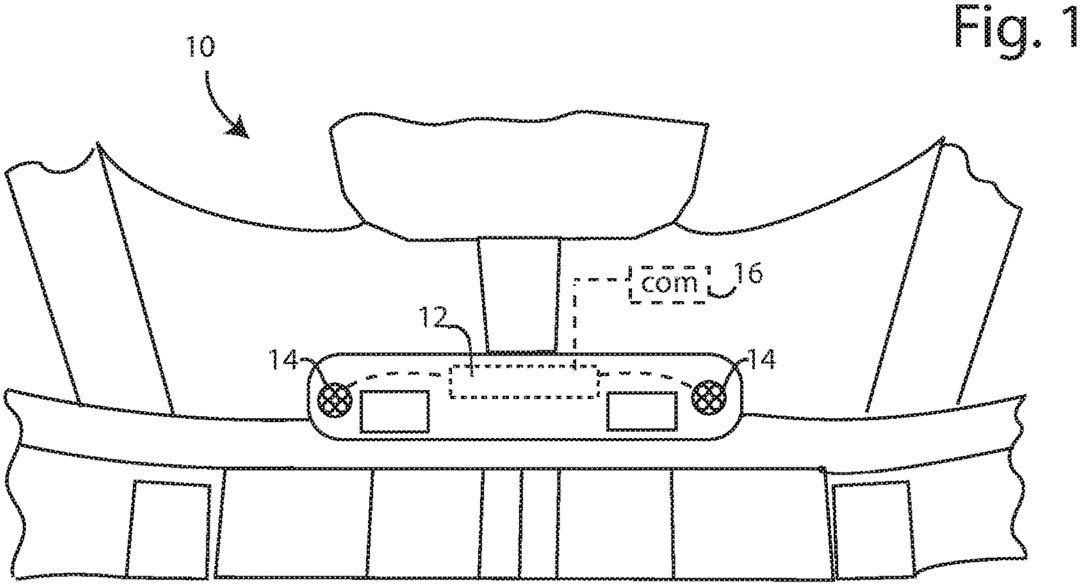
FIG. 2 is a cutaway view of a portion of the flight deck of FIG. 1 as it would appear to the pilot and copilot when seated, and also showing one possible placement of the ultrasonic phased array speaker system.

Referring to FIGS. 1 and 2, an embodiment of the ultrasonic phased array communication system 12 is deployed on the flight deck 10 of an aircraft. The ultrasonic phased array communication system electronics package may be placed in any convenient location, thus the illustrated location at 12 is merely exemplary. The system includes an ultrasonic transducer array 14 (two such arrays are illustrated here, one for pilot and one for copilot). The ultrasonic phased array communication system is coupled to the aircraft avionics communication system 16 to receive audio signals, such as voiced radio communications from air traffic control, intercom messages from flight attendants, aircraft audible alert messages, and the like. In FIGS. 1 and 2 the avionics communication system 16 has been shown in dotted lines to indicate that the physical location of that system can be deployed anywhere convenient.

The ultrasonic phased array communication system 12 and its associated transducer arrays 14 supply narrow beams 22 of ultrasonic acoustic energy directly to each pilot 20. Each beam comprises an ultrasonic acoustic carrier wave that has been modulated to carry the audio signals from the avionics communication system. The ultrasonic carrier, in an exemplary frequency range from about 30 kHz to 150 kHz, is well above the range of human hearing and is, itself, inaudible.

Figure 3A:
FIGS. 3*a*-3*c* are waveform diagrams illustrating different modulation techniques for implementing the ultrasonic phased array.
Figure 3B:
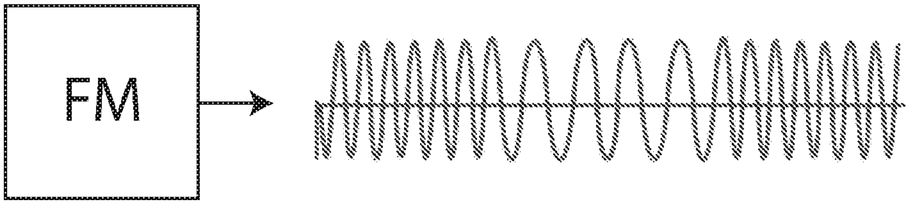
Figure 3C:
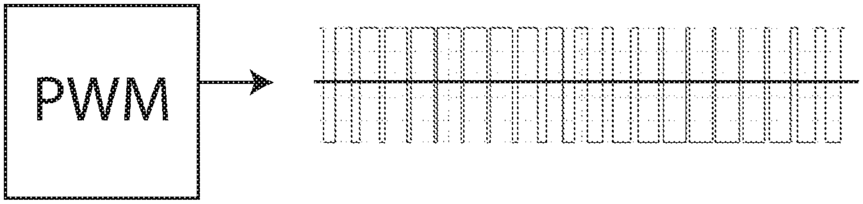

While a number of different modulation modes are possible, three have been illustrated in FIGS. 3*a*-3*c*. FIG. 3*a* illustrates amplitude modulation (AM), where the audio signal from the aircraft avionics communication system is used to modulate the amplitude of the ultrasonic carrier. FIG. 3*b* illustrates frequency modulation (FM), where the audio signal from the aircraft avionics communication system is used to modulate the frequency of the ultrasonic carrier. FIG. 3*c* illustrates one form of pulse width modulation (PWM) where the audio signal from the aircraft avionics communication system modulates the duty cycle of the ultrasonic carrier. In the AM and FM modulation cases, the ultrasonic carrier is typically based on a sinusoidal waveform, as illustrated. The PWM case offers other options, where the carrier may take the form of a square wave of varying duty cycle, and us thus well suited for amplification using highly efficient class D amplifiers.

Regardless of the modulation mode chosen, the modulated ultrasonic beam becomes naturally demodulated by passage through the air. Thus, as a natural consequence of interacting with air molecules in the acoustic space traversed by the beam, the signal is demodulated thus rendering the audio signal containing the message from the avionics communication system audible to the pilot 20.

The ultrasonic phased array preferably comprises a tightly grouped plurality of individual acoustic transducers, such as piezoelectric transducers. The acoustic transducers produce ultrasonic beams having a beam width that is a function of the ultrasonic carrier frequency. Accordingly, the system described here can control the beam width by controlling the ultrasonic carrier frequency. The close transducer spacing, combined with the high frequency ultrasonic carrier produces a narrow beam that concentrates the acoustic energy so that it travels preferably line-of-sight from transducer array directly to the pilot. In a practical embodiment, five watts of electrical power to the transducer array will produce a sound pressure level (SPL) on the order up to 115 dB or higher. More electrical power may be used if higher sound pressure levels (e.g., 140 dB) are desired. In such a system the acoustic signal delivered may have a frequency range from about 500 Hz to 4 kHz, which is usually adequate for good intelligibility of speech signals.

As the beam travels outwardly from each ultrasonic transducer array, there is minimal beam divergence within the first 2-3 meters from the transducer. Thus the ultrasonic beam will remain very directional to the pilot location and due to the relatively confined geometry of the cockpit, the beam will hit one or more surfaces (sidewalls, ceiling, floor, pilot's clothing, etc.) and become attenuated long before it reaches the cabin. Thus the pilot is able to hear the demodulated audio from his or her seat on the flight deck, but persons seated in the aircraft passenger cabin will not, due to ultrasonic wave absorption from impacting with sound absorbing surfaces, such as the sound absorbing wall and ceiling panels and carpeting, or from passenger clothing. In certain embodiments, the ultrasonic beam has a divergence angle based on the predetermined spacing of the transducers and the ultrasonic carrier frequency such that the audio signal is audible at the pilot seating location(s) and is substantially inaudible in a passenger cabin area within the aircraft.

In one embodiment, the phased array may be electronically fed with individual signals having carefully controlled individual time or phase delays to affect electronic steering of the beam. To better understand how beam steering is accomplished, refer to FIG. 4, which illustrates two transducers (e.g., speakers) arranged in a linear array. When both transducers are fed coherently with the same sinusoidal ultrasonic carrier signal, the carrier waves emanating from each transducer are in phase and the sound will appear to come straight on from the plane of the transducers, i.e., from a direction perpendicular to the horizontal axis (as seen in FIG. 4).

Figure 4:
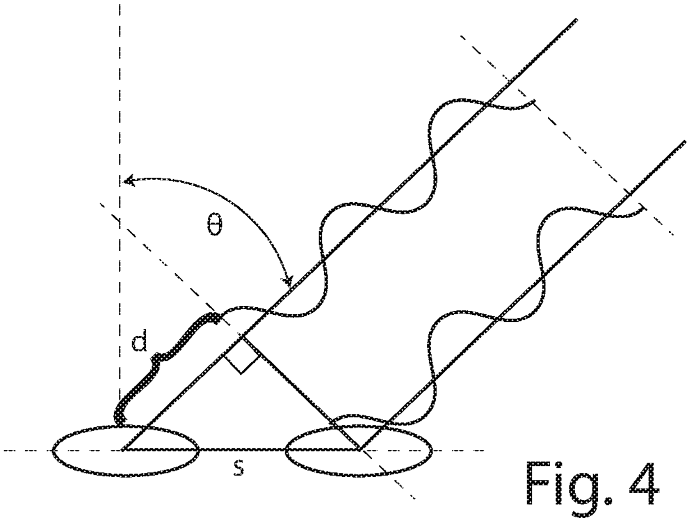
FIG. 4 is diagram illustrating how an inserted time delay is used to direct transducer beam patterns in the pilot communication system.

However, when one of the transducers is fed by a signal that is delayed by a time increment dt, constructive and destructive interference between the respective wavefronts of the two transducers will produce the loudest collective sound in an angled direction, no longer perpendicular but at an angle θ to the horizontal axis, as shown in FIG. 4. The angled direction can be computed trigonometrically, by knowing the wavelength of the audio frequency. Frequency (f) and wavelength (λ) which are related to the phase speed (v), according to the following equation:

$$f=v/\lambda$$

To steer the beam in the direction (angle θ) illustrated in FIG. 4, the signal from transducer on the left (in FIG. 4) is delayed by a time dt computed to account for the fact that the signal from transducer on the left (in FIG. 4 must traverse the additional distance d, in order for its wavefront to be in phase with the wavefront from the transducer on the right (in FIG. 4). This delay dt can be computed for a given angle θ using the following trigonometric relationship:

$$dt = s\ \sin(\theta)/c$$

where s is the transducer separation and c is the speed of sound in the air.

Control over timing (i.e., control over the phase of individual transducer waves) can be used not only to steer the collective ultrasonic beam in a particular direction but also to focus the individual transducer waves onto a desired point. The equation is the same: dt=dx/c. where dx is the difference between the distances from the transducers to the desired point and c is the speed of sound.

When designing the spacing between transducers, it is recommended to choose a spacing that avoids formation of strong grating lobes or side lobes. Grating lobes are a consequence of having large and uniform distances between the individual transducer elements in relation to the acoustic wavelength. Therefore, preferably small spacing (relative to ultrasonic wavelength) should be chosen, so that grating lobes are minimized. As noted above a spacing of less than ½ wavelength of the ultrasonic carrier may be used to minimize grating lobes or side lobes.

Figure 5:
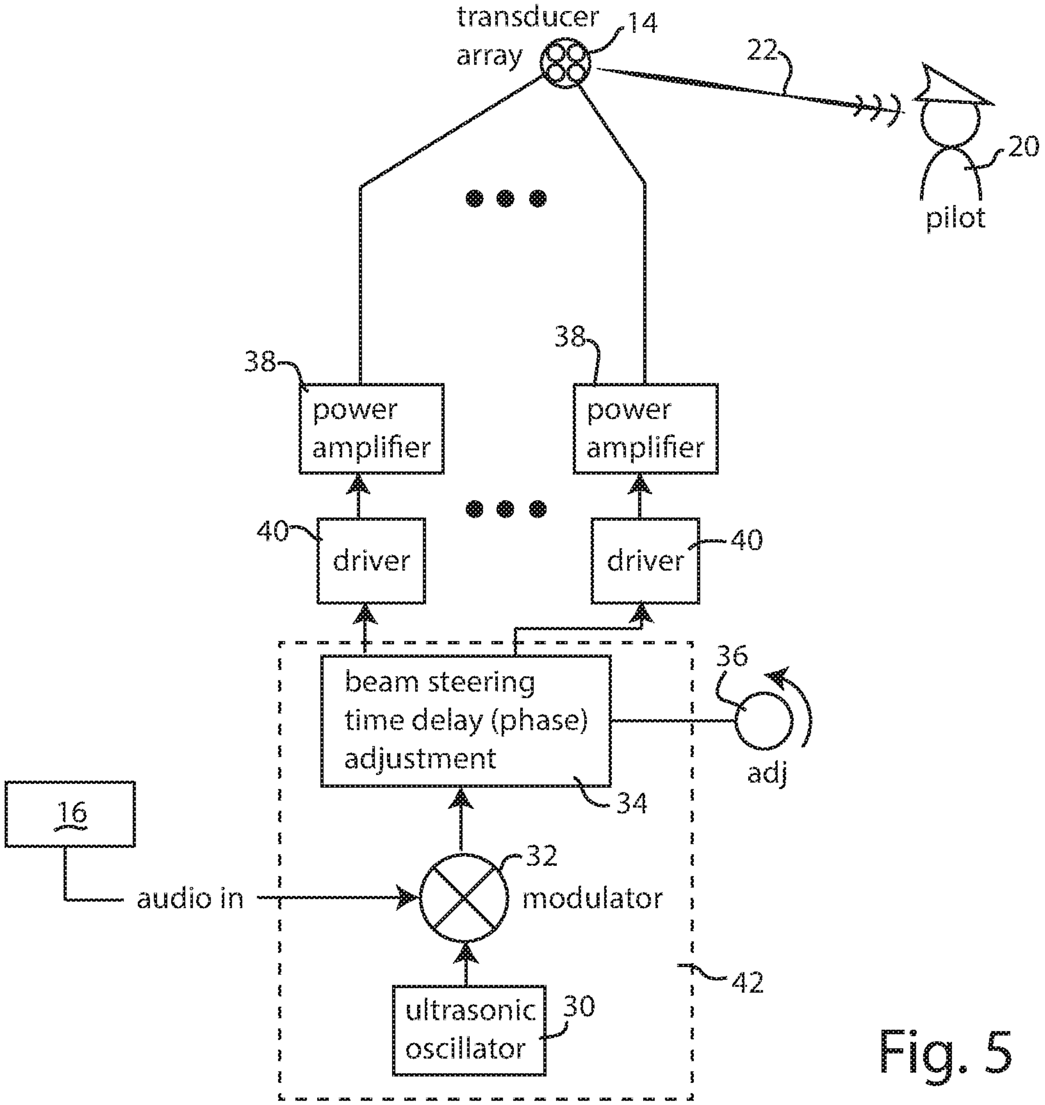
FIG. 5 is a schematic diagram illustrating one embodiment of the ultrasonic phased array transducer or speaker system.

Referring now to FIG. 5, an exemplary electronic circuit for producing the modulated ultrasonic beam will now be described. Audio input from the avionics communication system 16 is mixed with the ultrasonic carrier from ultrasonic oscillator 30 in a modulator 32, to produce the modulated ultrasonic carrier. The modulator 32 is configured to implement a predefined modulation mode, such as one of those illustrated in FIGS. 3*a*-3*c*.

If electronic beam steering is desired, this effect is applied by the time delay (phase delay) adjustment circuit 34. The adjustment circuit works by subdividing the modulated ultrasonic carrier into multiple channels, one for each of the individual transducers making up the transducer array 14. The adjustment circuit 34 selectively inserts a calculated time delay into one or more of the individual channels to produce the beam steering effect illustrated in FIG. 4. If desired, an adjustment control or interface 36 is provided to allow the beam to be steered to a desired direction, either manually or by automated control. Such an adjustment is useful, for example, to fine tune the beam direction so that the ultrasonic beam 22 is accurately directed to the pilot 20.

In order to produce sufficient sound pressure level at the pilot's location, the circuit includes an amplification stage for each of the multiple channels. This may be implemented using suitable power amplifiers 38 (one for each channel). Intermediate driver circuits 40 may be utilized to provide a suitable match between the impedance of the time delay adjustment circuit 34 and the power amplifiers 40.

If desired, one or more of the illustrated components may be implemented using a field programmable gate array (FPGA) circuit 42. In such an implementation, the ultrasonic oscillator, modulator and time delay functions are implemented using logic gates that are programmatically defined within the FPGA to perform the functions described above. While an FPGA circuit has been illustrated, the control hardware may be implemented using an FPGA, a microprocessor, a digital signal processor (DSP), or combinations thereof.

Figure 6:
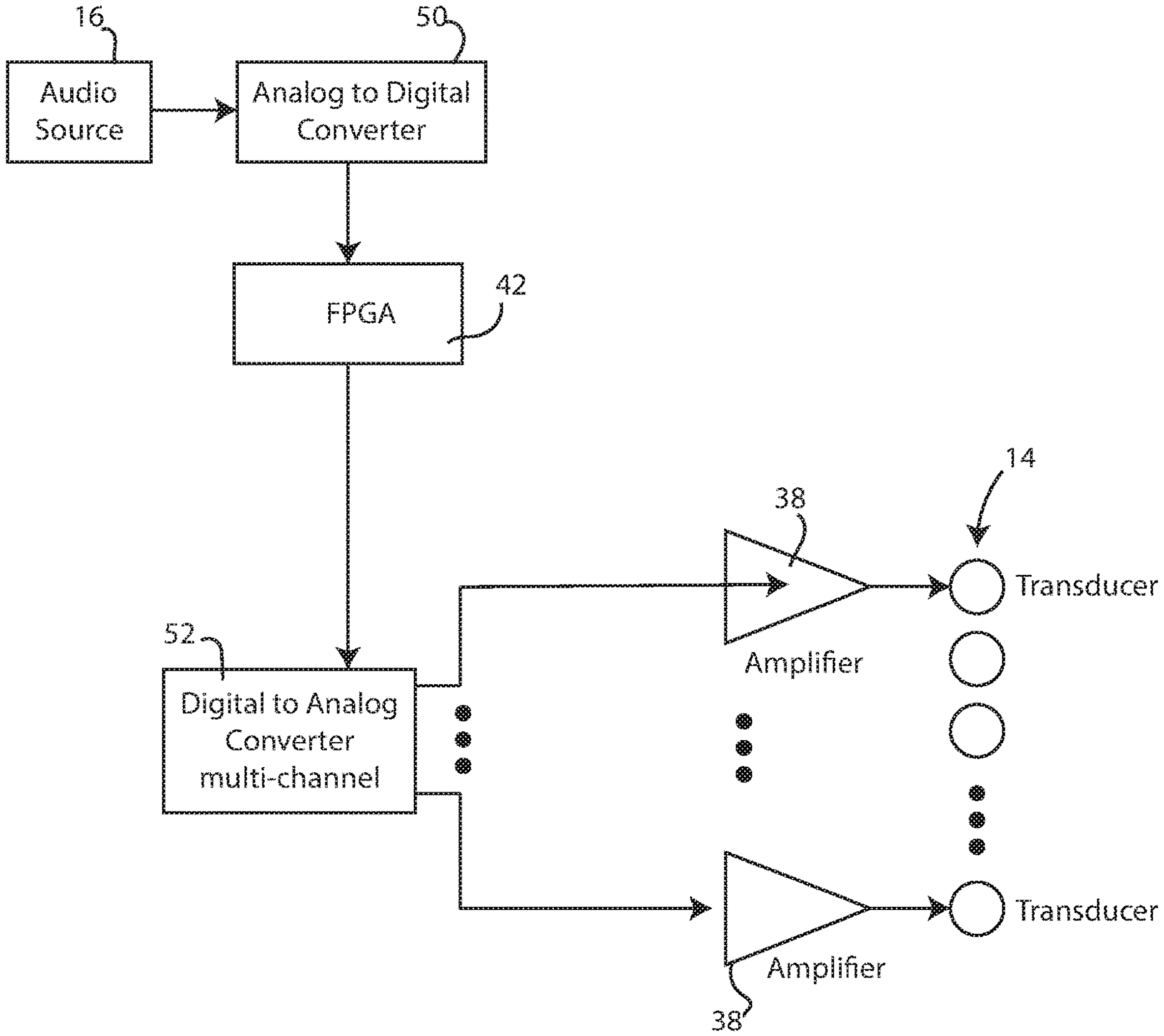
FIG. 6 is a schematic diagram illustrating further details of the ultrasonic phased array transducer or speaker system.

Referring to FIG. 6, the FPGA implementation is shown in greater detail. The audio input supplied by the avionics communication system 16 is converted from analog to digital form using analog to digital converter 50. The converted digital audio is then fed to the FPGA 42, which produces the ultrasonic modulated signal using an internally generated ultrasonic carrier that has been modulated using the supplied digital audio. The FPGA produces a multichannel output (one for each of the individual transducers comprising the ultrasonic transducer array 14.

The multichannel output from FPGA 42 is then fed to a multichannel digital to analog converter circuit 52, which converts each of the data streams into analog signals. These analog signals are then fed to the amplifiers 38 to drive the transducers.

Figure 7A:
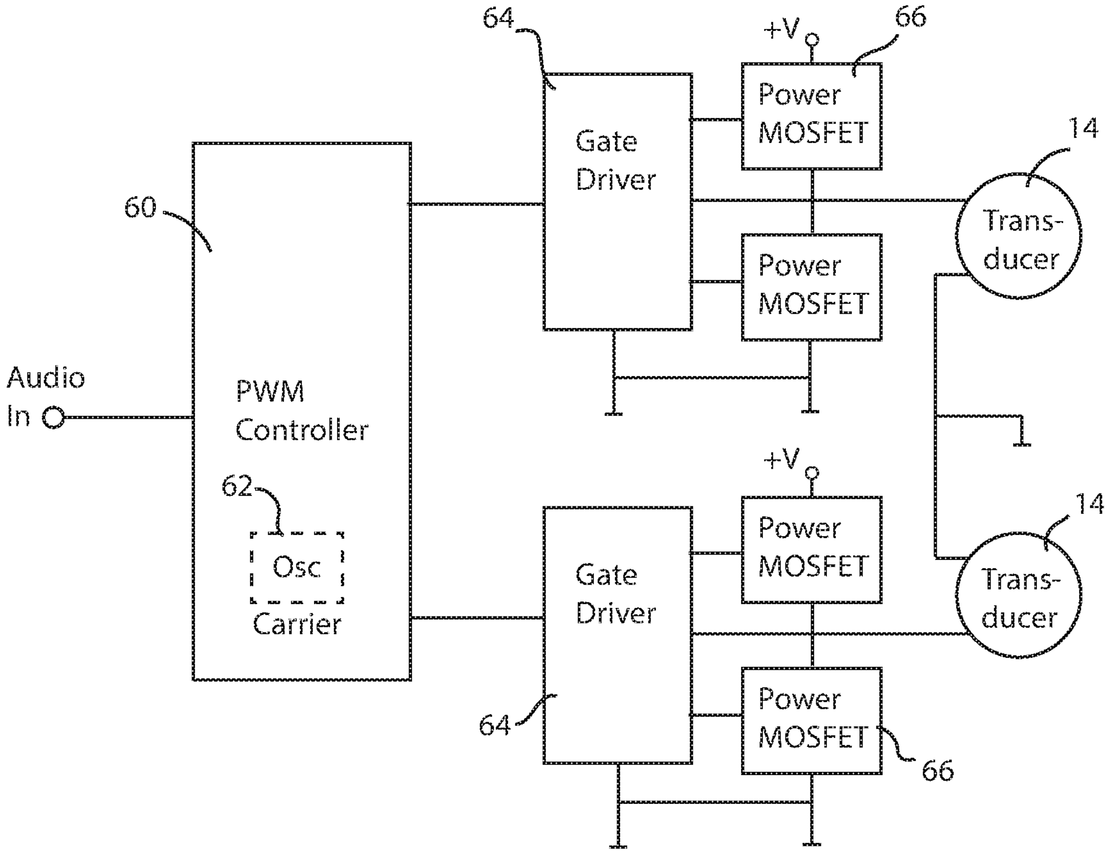
FIG. 7*a*-7*c* are schematic diagrams illustrating other embodiments of the ultrasonic phased array transducer or speaker system.

As noted above, the ultrasonic beam can be modulated using a non-sinusoidal carrier, such as the pulse width modulated carrier depicted in FIG. 3*c*. One exemplary circuit to accomplish such modulation is illustrated in FIG. 7*a*. The circuit of FIG. 7*a* can be implemented using either discrete components, such as dedicated integrated circuits, or it can be implemented to perform the PWM function using the FPGA 42. As depicted in FIG. 7*a*, a pulse width modulation controller circuit 60 may be utilized. Such PWM controller circuits are commonly used to implement switching power supplies, but can be used to produce the modulated ultrasonic waveforms used by the disclosed flight deck communication system.

The output of the PWM controller circuit 60 may be fed to suitable gate driver circuits (one for each transducer 14), as needed to provide proper voltage and sufficient current to drive the power MOFET transistor switches 66. In the illustrated circuit, a pair of power MOSFET transistors is used for each transducer 14, operating in push-pull configuration to achieve higher power to the transducer. The circuit could also be implemented using N-channel FETs with no P-channel FETs.

Figure 7B:
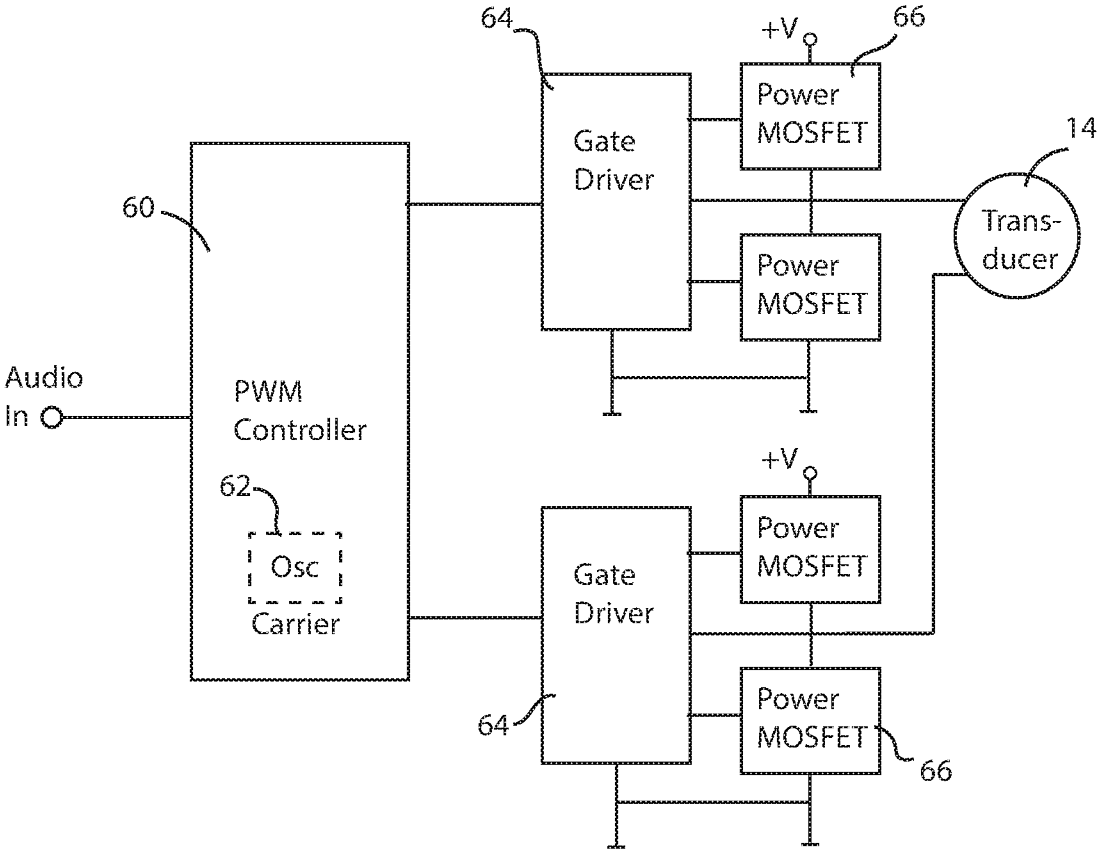
Figure 7C:
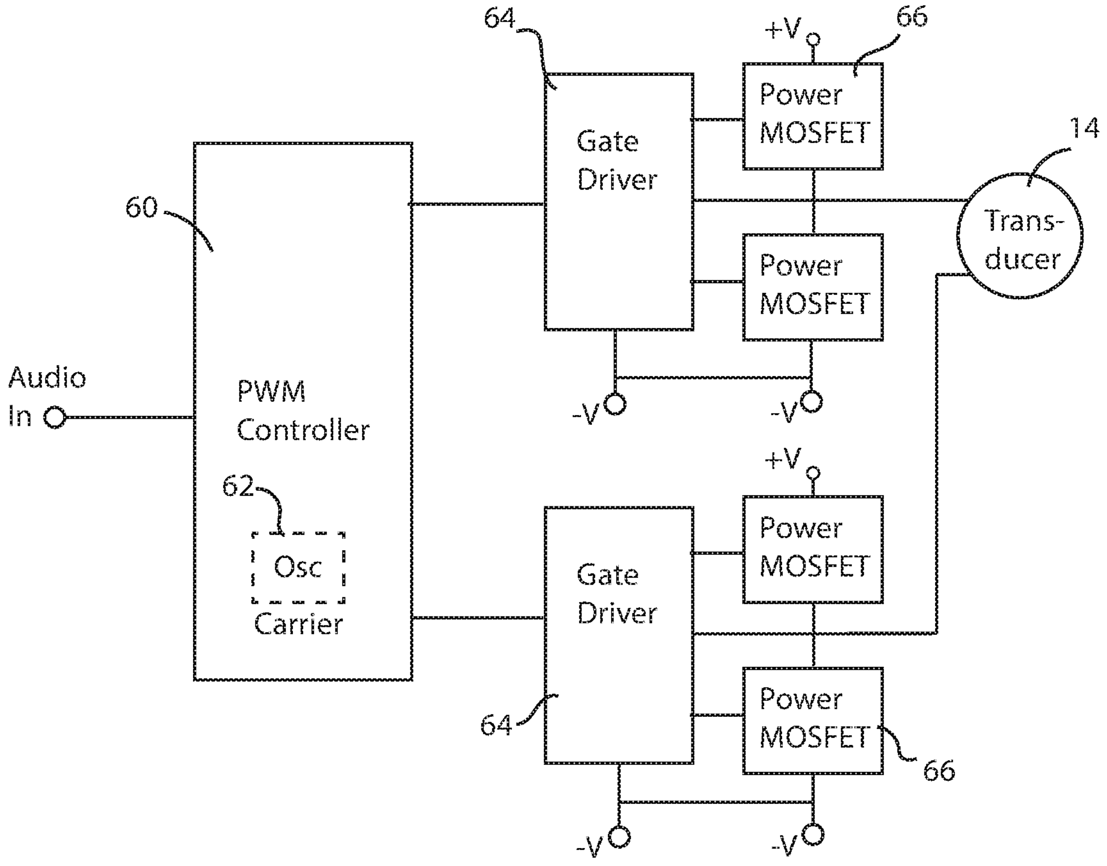

FIG. 7*b* depicts an alternate embodiment based on a full H-bridge configuration. FIG. 7*c* depicts a further alternate embodiment based on a full H-bridge configuration employing +V and −V power supply rails.

Several different spaced-apart transducer configuration patterns have been illustrated in FIGS. 8*a* through 8*g*. Other configuration patterns are also possible. These configurations patterns may be used singly or in combination. The transducers 14 are each arranged according to a predefined configuration pattern, such as but not limited to, those examples shown in FIGS. 8*a*-8*g*

FIG. 8*a* illustrates a linear array, where the transducers are centered along a common straight line. The transducers are spaced apart according to a predefined spacing pattern (e.g., equally spaced, logarithmically spaced, or with other spacing) and each is preferably fed by a dedicated audio signal transmission line coupled to the time delay adjustment circuit. In this way, the time delay adjustment circuit is able to send or receive a precisely timed audio signal to each transducer. The effect of such precisely timed audio signals is to produce an array beam pattern.

In the case of the linear array shown in FIG. 8*a*, the beam pattern can be controlled by the time delay adjustment circuit to provide one-dimensional beam steering. Thus, the linear array is well suited for deployment in flight deck locations where the linear array lies generally in a plane that includes the pilot's and copilot's heads.

FIG. 8*b* illustrates a curved or curvilinear array, where the transducers are centered along a common curved line. As with the linear array of FIG. 8*a*, the transducers may be equally spaced apart, logarithmically spaced, or spaced apart with bilateral symmetry. The curvilinear array is well suited for deployment in portions of the cockpit having naturally curved surfaces, as dictated by the shape of the fuselage. As with the linear array, the transducers of the curvilinear array may be fed by a dedicated audio signal transmission line coupled to the time delay adjustment circuit.

FIG. 8*c* illustrates a circular array. The transducers are preferably equally spaced, each fed by a dedicated audio signal transmission line coupled to the time delay adjustment circuit. The circular array is well suited for placement on the ceiling of the cockpit, such as above and forward of the pilots' heads. The circular array can provide two-dimensional beam steering.

FIG. 8*d* illustrates a concentric circular array. The transducers are preferably equally spaced around each concentric circle, each fed by a dedicated audio signal transmission line coupled to the time delay adjustment circuit.

FIG. 8*e* illustrates a spiral array where the transducers 14 are spaced according to a logarithmic pattern. The transducers are each fed by a dedicated audio signal transmission line coupled to the time delay adjustment circuit. The spiral array may provide different transducer spacings. This is a natural consequence of following a spiral pattern; however, in addition, the individual transducers may be spaced apart based on a logarithmic relationship.

FIG. 8*f* illustrates a square or rectilinear array. The transducers are each fed by a dedicated audio signal transmission line coupled to the time delay adjustment circuit. The square array is similar to the circular array, providing two-dimensional beam steering. The square array is suited in applications where packaging constraints dictate.

Figure 8G:
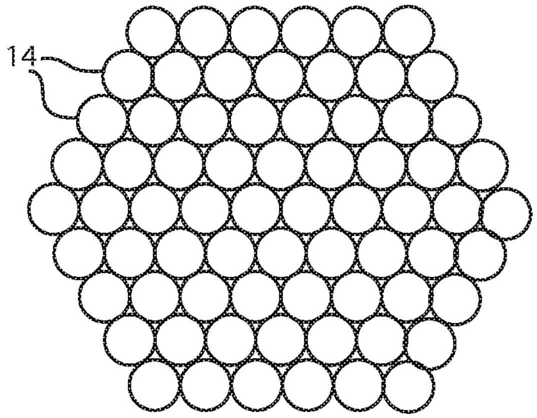

FIG. 8*g* illustrates a row cluster configuration in which the transducers 14 are tightly packed into a geometric shape. This configuration has the advantage of concentrating the acoustic energy into a small region to increase acoustic signal amplitude.

While the transducer spacings shown in FIG. 8*a*-8*d* are uniform, in practice, the spacing between the transducers could be constant, linear, logarithmic or based on other factors.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment as contemplated herein. It should be understood that various changes may be made in the function and arrangement of elements described in an exemplary embodiment without departing from the scope of the invention as set forth in the appended claims.

What is claimed is:

1. In an aircraft flight deck that defines an acoustic space enclosing air molecules and having a first pilot seating location for a first pilot and a second pilot seating location for a second pilot, and that includes an avionics communication system that produces communication audio signals consisting essentially of frequencies audible to human hearing, a pilot communication system comprising:

a modulator circuit coupled to receive a first communication audio signal and a second communication audio signal;

the modulator circuit coupled to and supplying to a first acoustic transducer array an electrical signal that causes the first acoustic transducer array to produce a first ultrasonic carrier wave modulated to carry the first communication audio signal to define a first modulated ultrasonic carrier wave, such that the first modulated ultrasonic carrier wave carries the first communication audio signal, the first ultrasonic carrier wave having an ultrasonic carrier frequency above human audibility with an associated ultrasonic carrier wavelength;

the modulator circuit coupled to and supplying to a second acoustic transducer array an electrical signal that causes the second acoustic transducer array to produce a second ultrasonic carrier wave modulated to carry the second communication audio signal to define a second modulated ultrasonic carrier wave, such that the second modulated ultrasonic carrier wave carries the second communication audio signal, the second ultrasonic carrier wave having an ultrasonic carrier frequency above human audibility with an associated ultrasonic carrier wavelength;

the first acoustic transducer array disposed on the aircraft flight deck proximate a center of the aircraft flight deck and directed to emit the first modulated ultrasonic carrier wave as a first ultrasonic beam that concentrates acoustic energy and is directed in a first direction, where the first direction extends from the first acoustic transducer array proximate the center of the aircraft flight deck outwardly towards the first pilot location and intersects a first cockpit surface, the first acoustic transducer array comprising a first plurality of ultrasonic transducer elements arranged in a first spaced-apart array;

the second acoustic transducer array disposed on the aircraft flight deck proximate the center of the aircraft flight deck and directed to emit the second modulated ultrasonic carrier wave as a second ultrasonic beam that concentrates acoustic energy and is directed in a second direction, where the second direction extends from the second acoustic transducer array proximate the center of the aircraft flight deck outwardly towards the second pilot location and intersects a second cockpit surface, the second acoustic transducer array comprising a second plurality of ultrasonic transducer elements arranged in a second spaced-apart array;

the first modulated ultrasonic carrier wave being demodulated naturally by traversal through air molecules between the first acoustic transducer array and the first pilot seating location, thus rendering the first communication audio signal audible by human hearing at the first pilot seating location; and the second modulated ultrasonic carrier wave being demodulated naturally by traversal through air molecules between the second acoustic transducer array and the second pilot seating location, thus rendering the second communication audio signal audible by human hearing at the second pilot seating location.

2. The pilot communication system of claim 1, further comprising an adjustment circuit to fine tune beam direction to direct the first ultrasonic beam to the first pilot at the first pilot location.

3. The pilot communication system of claim 1, further comprising an adjustment circuit to selectively steer the first ultrasonic beam in two dimensions and to selectively steer the second ultrasonic beam in two dimensions.

4. The pilot communication system of claim 1, further comprising an adjustment circuit to selectively steer the first ultrasonic beam in two dimensions to fine tune beam direction to direct the first ultrasonic beam to the first pilot at the first pilot location and to selectively steer the second ultrasonic beam in two dimensions to fine tune beam direction to direct the second ultrasonic beam to the second pilot at the second pilot location.

5. The pilot communication system of claim 1, further comprising an adjustment circuit to asymmetrically feed with respect to time the first plurality of ultrasonic transducer elements to adjust the first ultrasonic beam direction.

6. The pilot communication system of claim 1, further comprising an adjustment circuit, where the adjustment circuit comprises a multichannel time delay insertion circuit coupled between the modulator circuit and the first transducer array to selectively insert predetermined time delays into the feed of each of the first plurality of ultrasonic transducer elements to steer the first ultrasonic beam.

7. The pilot communication system of claim 1, wherein the first cockpit surface and the second cockpit surface are each selected from the group consisting of: cockpit sidewall, cockpit floor, cockpit ceiling and cockpit bulkhead.

8. The pilot communication system of claim 1, wherein the first plurality of ultrasonic transducer elements are arranged in a spaced-apart spatial configuration selected from the group consisting of: linear, curvilinear, circular, concentric circular, square, row cluster array, and spiral and combinations thereof.

9. The pilot communication system of claim 1, wherein the modulator circuit includes at least one amplifier for each of the first plurality of ultrasonic transducer elements.

10. The pilot communication system of claim 1, wherein the first acoustic transducer array is configured to substantially suppress formation of ultrasonic grating lobes and side lobes.

11. The pilot communication system of claim 1, wherein the first plurality of ultrasonic transducer elements are arranged in a spaced-apart spatial configuration with predetermined spacing between the plurality of ultrasonic transducer elements, and wherein the first ultrasonic beam has a divergence angle based on the predetermined spacing and the ultrasonic carrier frequency such that the first communication audio signal is audible at the first pilot seating location and substantially inaudible in a passenger cabin area within the aircraft.

12. The pilot communication system of claim 1 wherein the first plurality of ultrasonic transducer elements are spaced apart a distance less than or equal to one-half the wavelength of the ultrasonic carrier frequency to avoid formation of ultrasonic grating lobes while producing the first modulated ultrasonic carrier wave with a primary lobe shape that is substantially dictated by the ultrasonic carrier wavelength and directed in the first direction.

13. The pilot communication system of claim 1, wherein the ultrasonic carrier frequency is between 30 kHz to 150 kHz.

14. An aircraft, the aircraft comprising:

a flight deck that defines an acoustic space enclosing air molecules, the aircraft flight deck including at least a first cockpit surface and a second cockpit surface, the aircraft flight deck having a first pilot seating location for a first pilot and a second pilot seating location for a second pilot;

a pilot communication system that produces communication audio signals consisting essentially of frequencies audible to human hearing, a pilot communication system including:

a modulator circuit coupled to receive a first communication audio signal and a second communication audio signal;

the modulator circuit coupled to and supplying to a first acoustic transducer array an electrical signal that causes the first acoustic transducer array to produce a first ultrasonic carrier wave modulated to carry the first communication audio signal to define a first modulated ultrasonic carrier wave, such that the first modulated ultrasonic carrier wave carries the first communication audio signal, the first ultrasonic carrier wave having an ultrasonic carrier frequency above human audibility with an associated ultrasonic carrier wavelength;

the modulator circuit coupled to and supplying to a second acoustic transducer array an electrical signal that causes the second acoustic transducer array to produce a second ultrasonic carrier wave modulated to carry the second communication audio signal to define a second modulated ultrasonic carrier wave, such that the second modulated ultrasonic carrier wave carries the second communication audio signal, the second ultrasonic carrier wave having an ultrasonic carrier frequency above human audibility with an associated ultrasonic carrier wavelength;

the first acoustic transducer array disposed on the aircraft flight deck proximate a center of the aircraft flight deck and directed to emit the first modulated ultrasonic carrier wave as a first ultrasonic beam that concentrates acoustic energy and is directed in a first direction, where the first direction extends from the first acoustic transducer array outwardly towards the first pilot location and intersects the first cockpit surface, the first acoustic transducer array proximate the center of the aircraft flight deck comprising a first plurality of ultrasonic transducer elements arranged in a first spaced-apart array;

the second acoustic transducer array disposed on the aircraft flight deck proximate the center of the aircraft flight deck and directed to emit the second modulated ultrasonic carrier wave as a second ultrasonic beam that concentrates acoustic energy and is directed in a second direction, where the second direction extends from the second acoustic transducer array proximate the center of the aircraft flight deck outwardly towards the second pilot location and intersects the second cockpit surface, the second acoustic transducer array comprising a second plurality of ultrasonic transducer elements arranged in a second spaced-apart array;

the first modulated ultrasonic carrier wave being demodulated naturally by traversal through air molecules between the first acoustic transducer array and the first pilot seating location, thus rendering the first communication audio signal audible by human hearing at the first pilot seating location; and the second modulated ultrasonic carrier wave being demodulated naturally by traversal through air molecules between the second acoustic transducer array and the second pilot seating location, thus rendering the second communication audio signal audible by human hearing at the second pilot seating location.

15. The aircraft of claim 14, further comprising an adjustment circuit to fine tune beam direction to direct the first ultrasonic beam to the first pilot at the first pilot location.

16. The aircraft of claim 14, further comprising an adjustment circuit to selectively steer the first ultrasonic beam in two dimensions and to selectively steer the second ultrasonic beam in two dimensions.

17. The aircraft of claim 14, further comprising an adjustment circuit to selectively steer the first ultrasonic beam in two dimensions to fine tune beam direction to direct the first ultrasonic beam to the first pilot at the first pilot location and to selectively steer the second ultrasonic beam in two dimensions to fine tune beam direction to direct the second ultrasonic beam to the second pilot at the second pilot location.

18. The aircraft of claim 14, further comprising an adjustment circuit to asymmetrically feed with respect to time the first plurality of ultrasonic transducer elements to adjust the first ultrasonic beam direction.

19. The aircraft of claim 14, further comprising an adjustment circuit, where the adjustment circuit comprises a multichannel time delay insertion circuit coupled between the modulator circuit and the first transducer array to selectively insert predetermined time delays into the feed of each of the first plurality of ultrasonic transducer elements to steer the first ultrasonic beam.

20. The aircraft of claim 14, wherein the first cockpit surface and the second cockpit surface are each selected from the group consisting of: cockpit sidewall, cockpit floor, cockpit ceiling and cockpit bulkhead.

* * * * *